United States Patent Office 3,005,018
Patented Oct. 17, 1961

3,005,018
SYNTHESIS OF STEROIDS
Frank L. Weisenborn, Middlebush, Leonard J. Lerner, New Brunswick, and Allen I. Laskin, Franklin Township, Somerset County, N.J., assignors to Olin Mathieson Chemical Corporation, New York, N.Y., a corporation of Virginia
No Drawing. Filed Oct. 7, 1959, Ser. No. 844,869
3 Claims. (Cl. 260—488)

This invention relates to, and has for its object, the provision of steroids of the A-norpregnene series having a 7α-hydroxy group or a 7α-acyloxy group. More particularly, this invention relates to 7α-hydroxy-A-norprogesterone and esters thereof with hydrocarbon carboxylic acids having less than ten carbon atoms, having the formula:

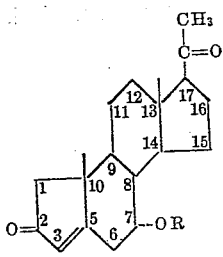

wherein R is hydrogen or the acyl radical of a hydrocarbon carboxylic acid having less than ten carbon atoms.

7α-hydroxy-A-norprogesterone, is prepared by subjecting A-norprogesterone to the action of the enzymes of the microorganisms *Diplodia natalensis* under oxidizing conditions, the oxidation being effected either by including the steroid in an aerobic culture of the microorganism, or by bringing together, in an aqueous medium, the steroid, air and enzymes of non-proliferating cells of the microorganism.

In general, the conditions for culturing *Diplodia natalensis* for the purposes of this invention are (except for the inclusion of the steroid to be converted) the same as those for culturing various other molds for the production of antibiotics and/or riboflavin, i.e., the microorganism is aerobically grown in contact with a suitable fermentation medium. A suitable medium essentially comprises a source of nitrogen and a source of carbon and energy. The latter may be a carbohydrate (such as sucrose, molasses, glucose, maltose, starch or dextrin), a fatty acid, a fat and/or the steroid itself. Preferably, however, the medium includes an assimilable source of carbon and energy in addition to the steroid The source of nitrogenous factors may be organic (e.g., soybean meal, corn steep liquor, meat extract and/or distillers' solubles) or synthetic (i.e., composed of simple, synthesizable organic or inorganic compounds such as ammonium salts, alkali nitrates, amino acids or urea).

An adequate sterile-air supply should be maintained during fermentation, for example by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10%. The culture period may vary considerably, the range of about 6 to 96 hours being feasible, but not limiting.

The process yields 7α-hydroxy-A-norprogesterone, a steroid useful not only as an intermediate in the preparation of the esters of this invention, but also, in common with said ester derivatives, as an androgen antagonist (i.e., an agent which inhibits the action of androgens such as testosterone). Hence, 7α-hydroxy-A-norprogesterone and esters thereof, particularly esters with hydrocarbon carboxylic acids of less than ten carbon atoms (e.g., the lower alkanoic acids as exemplified by acetic, propionic and enanthic acid, the lower alkenoic acids, the aralkanoic acids as exemplified by α-toluic and β-phenylpropionic, the cycloalkane carboxylic acids, and the aromatic acids as exemplified by benzoic and o, m, or p-toluic acid) can be used to inhibit the development of male characteristics caused by the presence of an excess amount of testosterone, for which purpose they are administered parenterally, being formulated for such administration in the same type of preparations as other parenterally administered steroids, with concentration and/or dosage being based on the activity of the particular steroid.

The esters of 7α-hydroxy-A-norprogesterone are prepared in the usual manner, as by treatment of 7α-hydroxy-A-norprogesterone with the desired acid anhydride or acyl halide in an organic solvent (preferably an organic base such as pyridine) to yield the desired 7α-acyloxy-A-norprogesterone.

7α-hydroxy-A-norprogesterone in being readily converted to A-norprogesterone is useful as a shelf stable source of A-norprogesterone. To effect such conversion, 7α-hydroxy-A-norprogesterone is treated with mesyl chloride (in pyridine) to yield the 7α-mesyloxy derivative which is converted to its iodide by treatment with an alkali metal iodide (in a solvent such as acetic acid) which in turn is reduced (e.g., with zinc and acetic acid) to yield A-norprogesterone.

The following examples are illustrative of the invention:

EXAMPLE I

*7α-hydroxy-A-norprogesterone*

(a) *Fermentation.*—Surface growth from each of five two-week old agar slant cultures of *Diplodia natalensis* (ATCC 9055), the slant containing as nutrient medium (A):

| | G. |
|---|---|
| Glucose | 10 |
| Yeast extract | 2.5 |
| K₂HPO₄ | 1 |
| Agar | 20 |
| Distilled water to 1 liter. | | is suspended in 2.5 ml. of an 0.01% Dupanol aqueous solution. One ml. portions of the suspension are used to inoculate ten 250 ml. conical flasks, each containing 50 ml. of the following sterilized medium (B):

| | G. |
|---|---|
| Dextrose | 10 |
| Corn steep liquor | 6 |
| NH₄H₂PO₄ | 3 |
| Yeast extract | 2.5 |
| CaCO₃ | 2.5 |
| Soybean oil | 2.2 |
| Distilled water to 1 liter. | |

After 72 hours' incubation at 25° C. with continuous rotary agitation (280 cycles per minute; 2 inch radius), 10% (vol./vol.) transfers are made to sixty-seven 250 ml. conical flasks each containing 50 ml. of fresh sterilized medium B plus 300 micrograms/ml. of A-norprogesterone. (The steroid is added by supplementing each flask with 0.25 ml. of a sterile solution of the steroid in N,N-dimethyl-formamide containing 60 mg./ml. of steroid. A total of 1 g. is used.) After 24 hours of further incubation, the contents of the flasks are pooled and filtered through a Seitz clarifying pad. The flasks mycelium and pads are washed with successive 50 ml. portions of warm water. The combined filtrate and washing have a volume of 3670 ml.

(b) *Isolation and characterization.*—The combined filtrate and washings are extracted three times with 1 l. portions of chloroform. The chloroform extracts are washed with water, dried over sodium sulfate and concentrated to dryness under vacuum leaving 930 mg. of crude product. The substance is then chromatographed on 50 g. of acid washed alumina. Elution of the column with 30–70% chloroform-benzene gives about 460 mg. of pure 7α-hydroxy-A-norprogesterone which crystalizes from acetone-hexane in colorless needles, M.P. about 161–161.5° C.; [α]$_D$ +65° (CHCl$_3$);

$\lambda_{max}^{alc.}$ 236 mμ (ε=15,300); $\lambda_{max}^{Nujol}$ 2.89μ, 5.89μ, 5.94μ, 5.99μ, 6.19μ

*Analysis.*—Calcd. for $C_{20}H_{28}O_3$: C, 75.91; H, 8.92. Found: C, 75.82; H, 8.97.

EXAMPLE II

*7α-acetoxy-A-norprogesterone*

A solution of 20 mg. of 7α-hydroxy-A-norprogesterone in 0.5 ml. of pyridine and 0.5 ml. of acetic anhydride is allowed to stand overnight at room temperature. Removal of the excess reagents in vacuo leaves a crystalline residue (about 25 mg.) which after two recrystallizations from acetone-hexane furnishes pure 7α-acetoxy-A-norprogesterone.

Similarly by substituting other acid anhydrides, such as propionic anhydride, or acyl halides, such as benzoyl chloride, for the acetic anhydride in the procedure of Example II, the corresponding ester derivatives are produced.

The invention may be variously embodied within the scope of the appended claims.

What is claimed is:

1. A member selected from the group consisting of 7α-hydroxy-A-norprogesterone and esters thereof with hydrocarbyl carboxylic acids of less than ten carbon atoms.
2. 7α-hydroxy-A-norprogesterone.
3. 7α-hydroxy-A-norprogesterone acetate.

No references cited.